Jan. 25, 1944.  E. W. CHRISTY ET AL  2,339,978
MECHANICAL MOVEMENT
Original Filed Sept. 23, 1940    4 Sheets-Sheet 1

INVENTORS.
Elmer W. Christy.
BY William S. Dickson
Murray, Sachnoff & Paddock
ATT'YS.

Jan. 25, 1944.  E. W. CHRISTY ET AL  2,339,978
MECHANICAL MOVEMENT
Original Filed Sept. 23, 1940  4 Sheets-Sheet 2

INVENTORS.
*Elmer W. Christy.*
BY *William S. Dickson.*
Murray, Sackhoff & Paddock
ATT'YS.

Jan. 25, 1944.  E. W. CHRISTY ET AL  2,339,978
MECHANICAL MOVEMENT
Original Filed Sept. 23, 1940  4 Sheets-Sheet 3
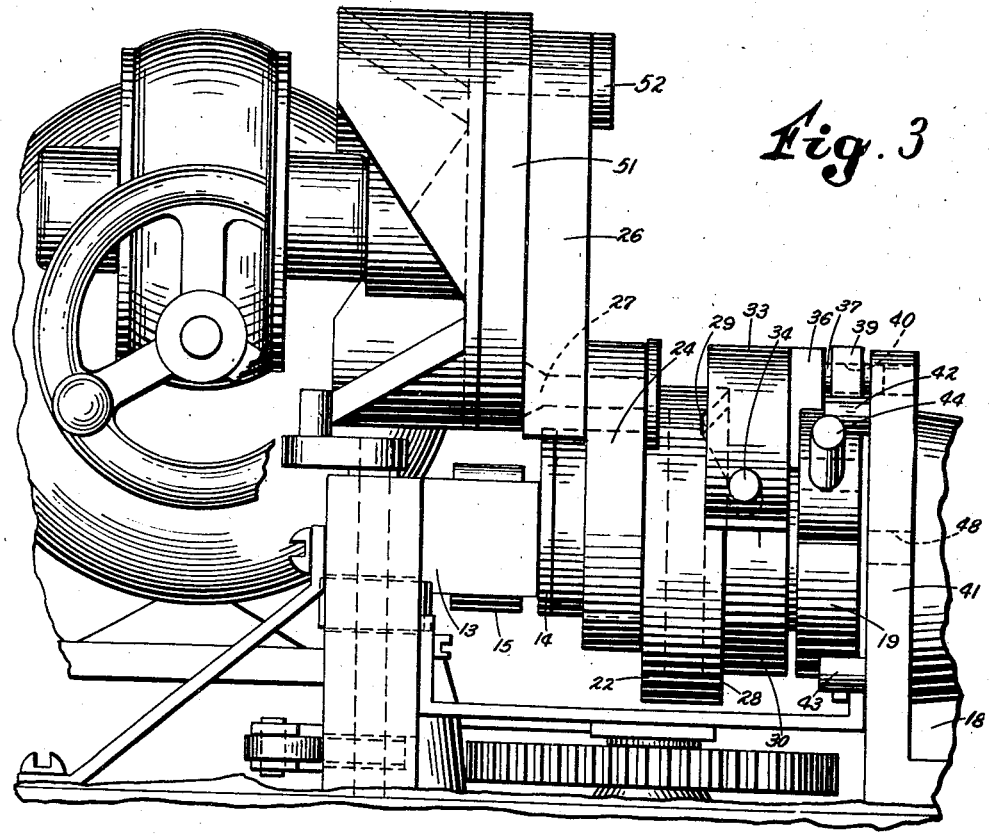
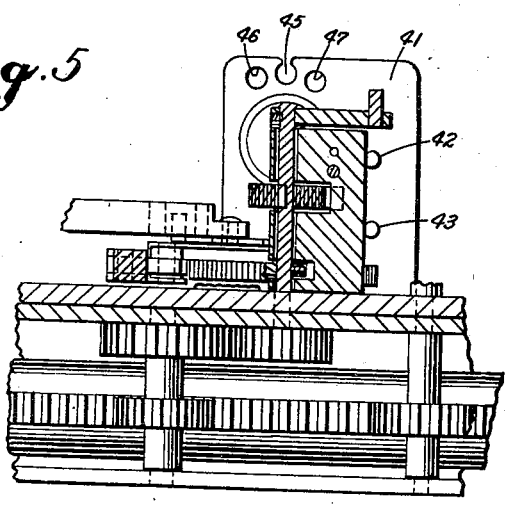
INVENTORS.
Elmer W. Christy.
BY William S. Dickson.
Murray, Sackhoff & Paddock
ATT'YS.

Jan. 25, 1944.  E. W. CHRISTY ET AL  2,339,978
MECHANICAL MOVEMENT
Original Filed Sept. 23, 1940   4 Sheets-Sheet 4
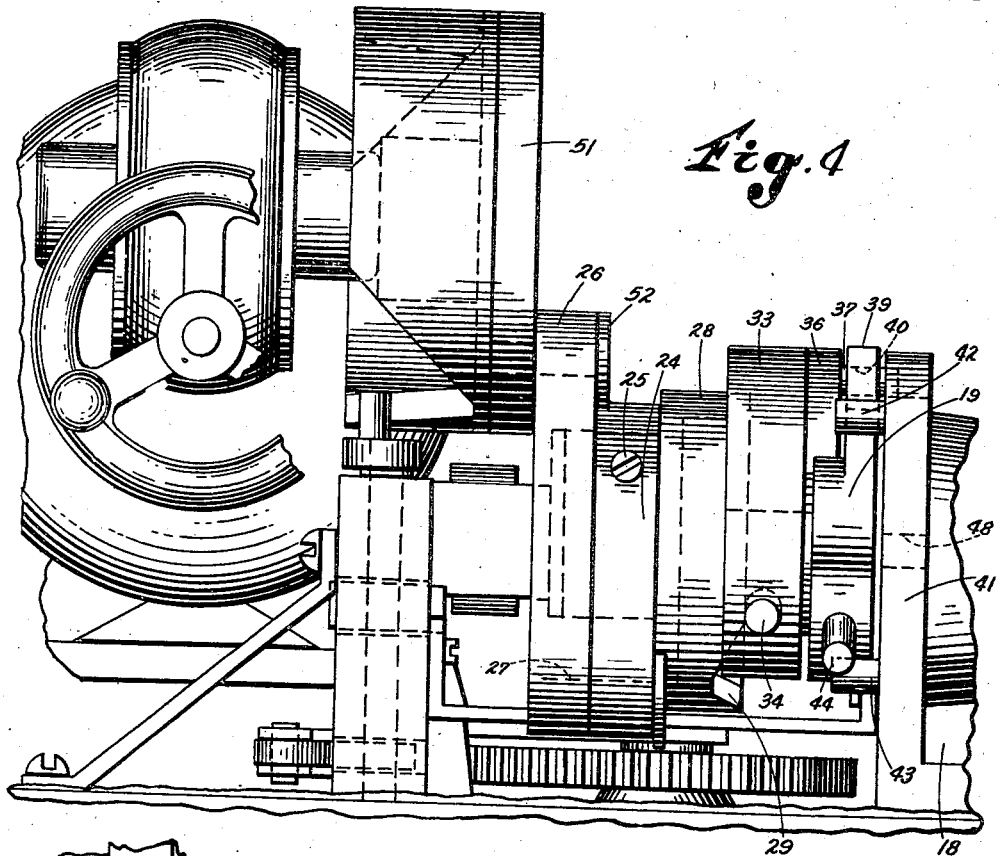
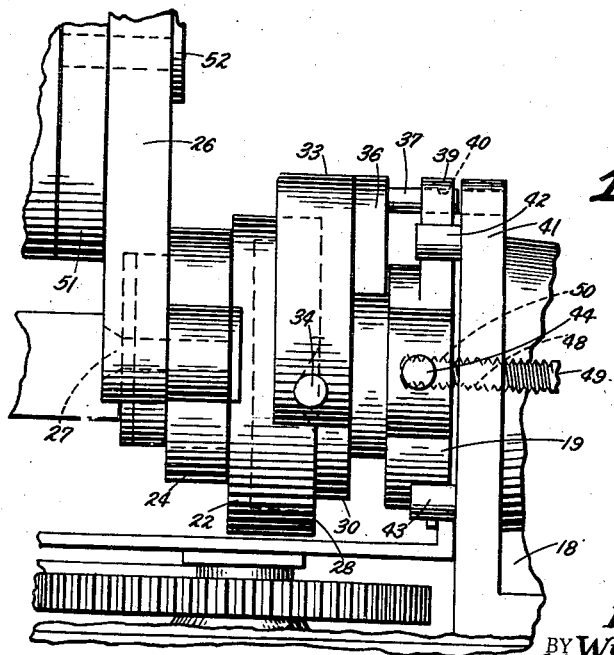
INVENTORS.
Elmer W. Christy,
BY William S. Dickson.
Murray, Sackhoff & Paddock ATT'YS Patented Jan. 25, 1944

2,339,978

UNITED STATES PATENT OFFICE 2,339,978

MECHANICAL MOVEMENT

Elmer W. Christy and William S. Dickson,
Cincinnati, Ohio

Original application September 23, 1940, Serial No. 357,968. Divided and this application March 1, 1943, Serial No. 477,532

3 Claims. (Cl. 74—23)

This application is a division of our co-pending application Serial Number 357,968, filed September 23, 1940.

The present invention relates to a mechanical movement and has for an object the provision of a mechanism for deriving a sequence of oscillatory and reciprocatory movements from a continuously rotating member.

A further object of the invention is to provide a mechanism to supply each of such movements with precision and for measured intervals during which all of the other movements are positively arrested.

Still another object of the invention is to provide a movement of the class described wherein the extent of oscillating motion is predetermined and wherein the reciprocating motion may be obtained without any oscillating motion if desired.

A still further object of the invention is to provide a compact and sturdy mechanism of this kind that is easily arranged for synchronized operation in conjunction with other associated mechanism.

These and other important objects are attained by the means described herein and disclosed, by way of example, in the accompanying drawings, in which:

Fig. 3 is an enlarged fragmental side elevational view showing the relation of parts at one limit of oscillatory movement.

Fig. 4 is a view similar to Fig. 3, but showing the parts at the opposite limit of oscillatory movement.

Fig. 5 is a fragmental cross-sectional view taken on line 5—5 of Fig. 2, with intervening parts removed.

Fig. 6 is an enlarged fragmental side elevational view the parts in an intermediate position, and there retained by a removably inserted member for optionally limiting the derived motion to reciprocatory motion only.

Figure 1:
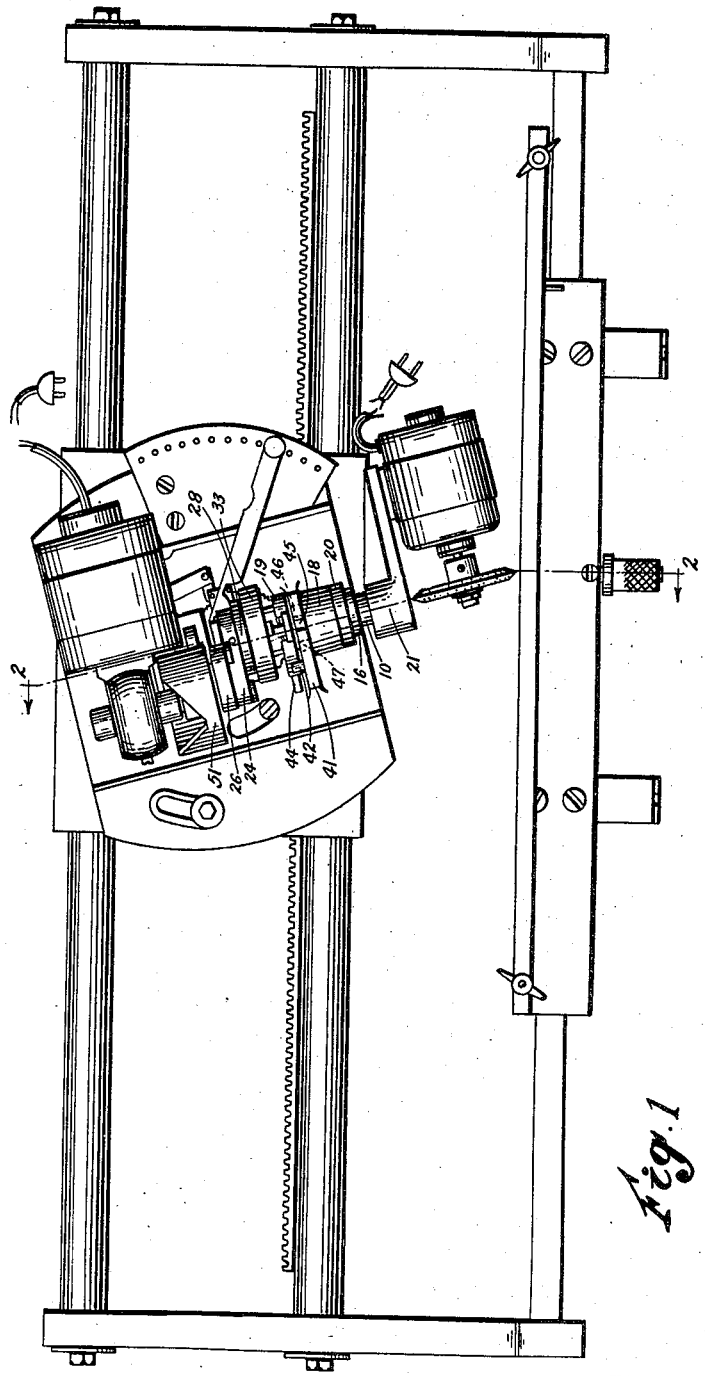
Fig. 1 is a top plan view of a tooth generating machine embodying the mechanical movement of the invention.
Figure 2:
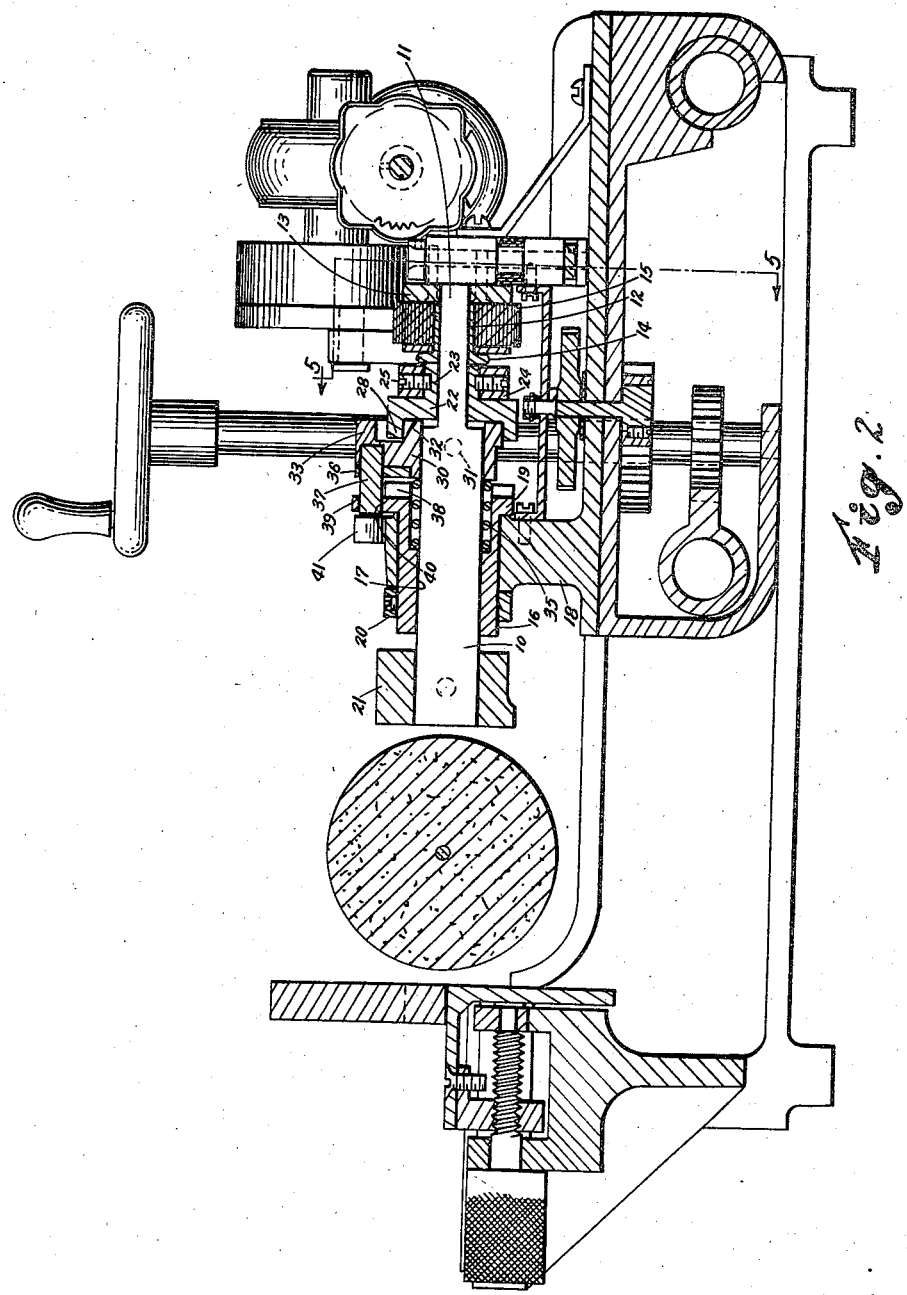
Fig. 2 is an enlarged cross-sectional view taken on line 2—2 of Fig. 1.

The mechanical movement of the invention is herein illustrated as embodied in a saw tooth generating machine, but is not to be considered limited in its application to any particular class of machine. Oscillatory and reciprocatory motions may be attained in various machines or devices by the means of the present invention.

As shown in the drawings, a main shaft 10 has an end portion 11 of reduced diameter on which is splined a thimble 12. The thimble 12 has a bearing in opposite sides of a hollow block 13 and is further provided with a flange 14 seating against the outside face of said hollow block. Coiled about thimble 12 is a spring 15 located within the hollow block 13 and the opposite ends of said spring are secured respectively to said thimble and said block. The spring may be tensioned to counterbalance any inequality of load that may be placed on the shaft during oscillation.

At its opposite end the shaft 10 is received in a sleeve 16, which, in turn passes through a bore 17 in an upright bearing boss 18. Sleeve 16 may turn in bore 17 but is retained against endwise movement by an integral flange 19 and an attached ring 20. The free end of shaft 10 carries or is connected to any instrumentality which usefully employs the movements of the shaft. In the disclosure herein, a bracket 21 of an independently motor driven cutting agent 21 is attached to shaft 10. By the hereinafter described means the shaft 10 is caused to turn on its axis in one direction for a predetermined distance to a stop, then reciprocate forwardly endwise and return, after which it is caused to turn on its axis in the opposite direction to a stop where the endwise reciprocation is repeated to complete a full cycle of operation.

A rocker cam member 22 has an extended hub 23 abutting the flange 14 of thimble 12 and freely rockable on the reduced end 11 of shaft 10. A crank arm 24 is fixedly mounted on hub 23 as by screws 25. The free end of crank arm 24 is pivoted to the end of a pitman 26 by means of a pin 27.

Rocker cam member 22 has an annular flange 28 cut away at diametrically opposite sides to provide cam faces 29.

Cooperating with cam member 22 is a complementary cam member 30 which is fixed to shaft 10 by a pin or set screw at 31. Member 30 has an annular flange 32 which enters slidably beneath annular flange 28 of rocker cam member 22. Concentric with and spaced outwardly of flange 32 is an integral flange 33 which is cut away below shaft 10 to leave a little more than half of a complete circumference. Diametrically opposite each other and adjacent the opposite ends of flange 33 are inwardly extending pins 34 which may cooperate with cam faces 29 of rocker cam member 22. It is to be noted therefore that since member 30 is fixed to shaft 10, said shaft has its motion imparted to it by said member 30. A compression spring 35 is coiled about shaft 10 and seats against member 30 at one end, while the other end of said spring enters and abuts the end of a counter-bore in sleeve 16 and thereby yieldably urges member 30 with the aforesaid pins 34 into cooperation with rocker cam member 22. When the pins 34 are held in the cut away places 29 of flange 28 on the rocker cam member 22, oscillation of the latter member will be imparted to member 30 and shaft 10. Cam member 30 has an attached or integral lug 36 with a horizontal guide stud 37 extending therefrom. The flange 19 on sleeve 16 has a cross slot 38 cut approximately half-way through its thickness, the slot 38 being of such width as to slidably receive lug 36 when cam member 30 and shaft 10 are moved forwardly against the resistance of spring 35.

In order that slot 38 shall be at all times aligned with lug 36, flange 19 has an upstanding lug 39 with an opening or hole 40 in which the guide stud 37 may reciprocate but from which the stud is never withdrawn.

As can be best seen in Figs. 3 to 6, inclusive, the upright bearing boss 18 has an integral wall-like flange 41, directly behind which the flange 19 on sleeve 16 is disposed. In the rear face of flange 41 and adjacent the periphery of the flange 19 of sleeve 16 are fixed an upper stop pin 42 and a lower stop pin 43. Extending radially from flange 19, at 90° from lug 39, is a projecting pin 44 which cooperates alternately with pins 42 and 43 to positively arrest and limit oscillatory movement of said flange 19, and through it the associated parts 36, 37, 30, 33 and 34.

In flange 41 directly above the axis of shaft 10 is a slot or opening 45 and on either side of this slot are bores 46 and 47 with which the end of guide stud 37 registers at opposite ends of its oscillatory movement as limited by the aforesaid pin 44 as it alternately abuts stop pins 42 and 43.

Flange 41 is further provided with a threaded bore 48 disposed midway between pins 42 and 43 and closer to center so that, when desired, the flange 19 may be fixed against oscillation, with its pin 44 held midway between pins 42 and 43, by inserting threaded pin 49 through bore 48 and into a complementary threaded bore 50 in said flange. When so fixed the hole 40 in flange 39 is in registry with slot 45 in flange 41, and the guide stud 37 may reciprocate into and from slot 45. As will be readily understood the threaded pin is inserted, as described, only when it is desired to utilize a reciprocating motion only without intervening oscillations.

In the present embodiment a constantly power driven disc 51 has one end of pitman 26 pivoted thereto by a removable pin 52. According to known practice the desired length of stroke of the pitman 26 is provided by selecting the connection of pin 52 at a proper distance from the center of disc 51.

The operation of the mechanical movement is as follows. Rocker cam member 22 is oscillated through a predetermined number of degrees by pitman 26 operating on crank arm 24. Pins 34 on member 30 seating in the bottoms of the grooves in flange 28 are held there by the action of spring 35. The shaft 10, being fixed with member 30 will partake of the rotary motion of member 22. The sleeve 16 and its slotted flange 19 also rotate with member 30 since guide stud 37 extends into the perforate lug 39 of flange 19. This rotation is arrested when pin 44 in flange 19 engages fixed stop pin 43 in flange 41. As the rocker cam 22 continues its power movement in the same direction, the pins 34 ride up the cam faces 29 and push the member 30 axially away from it and thus imparts a similar endwise motion to shaft 10. During this movement the guide stud 37 entered hole 47 in flange 41 and held the shaft against any rotary motion. When rocker cam 22 now rocks in the opposite direction the pins 34 ride down into the grooves 29 in flange 28 and the spring 35 pushes the parts to the original position and retracts shaft 10 axially. This constitutes one-half the cycle of operation. As the rocker cam 22 continues its movement said movement is picked up by member 30 and its pins 34 to rotate the shaft 10 in the opposite direction until pin 44 strikes stop pin 42. Then rotation of shaft 10 is arrested and the forward and return reciprocation of the shaft is repeated. The guide stud operated in hole 46 in the last mentioned movement.

When reciprocation of shaft 10 is desired without any oscillation, the threaded pin 49 is introduced as shown in Fig. 6, so that a forward and return movement of shaft 10 is produced on each half-oscillation of member 22.

The movement is useful wherever precision movements of the character described are desired. The tooth generating machine illustrated is but one example.

What is claimed is:

1. In combination a shaft mounted for rocking and reciprocating movement, a rocker cam rockable on the shaft, means to impart predetermined power movement to the rocker cam, a complementary cam member fixed on the shaft, means yieldingly urging said shaft in one direction and retaining the complementary cam member in engagement with said rocker cam, a rocking disc positively spaced from the rocker cam, said complementary cam member being disposed intermediate said rocker cam and said rocking disc and positively limiting the extent of axial reciprocating movement in opposite directions, a guide stud on said complementary cam member and extending slidably through the rocking disc whereby the disc partakes of the rocking movement of the shaft, a stationary flange alongside said rocking disc and having bores spaced apart and adapted to slidably receive the end of the guide stud, a pair of spaced stop pins fixed in said flange, and a cooperating pin in the periphery of the rocking disc.

2. In combination a continuously rotating power disc, a shaft having its axis parallel to the axis of rotation of said power disc, a rocker cam freely rockable on said shaft, a pitman connected to said disc and said cam for constantly rocking said cam, a complementary cam fixed on the shaft, means yieldably urging the complementary cam against said rocker cam whereby said cam normally imparts rocking movement to the shaft, means to arrest rocking movement of the shaft prior to the termination of each rocking cycle of the rocker cam whereby the continuation of said rocking cycle of the cam forces the shaft axially in a direction away from the cam against the resistance of said yielding means, and whereby initial movement of the cam on its return movement permits opposite axial movement of the shaft under the influence of said yielding means, and means precluding rocking movement of the shaft during axial movement thereof and precluding axial movement of the shaft during rocking movement.

3. In combination a continuously rotating power disc, a shaft having its axis parallel to the axis of rotation of said power disc, a rocker cam freely rockable on said shaft, a pitman connected to said disc and said cam for constantly rocking said cam, a complementary cam fixed on the shaft, means yieldably urging the complementary cam against said rocker cam whereby said cam normally imparts rocking movement to the shaft, means to arrest rocking movement of the shaft prior to the termination of each rocking cycle of the rocker cam whereby the continuation of said rocking cycle of the cam forces the shaft axially in a direction away from the cam against the resistance of said yielding means, and whereby initial movement of the cam on its return movement permits opposite axial movement of the shaft under the influence of said yielding means, means precluding rocking movement of the shaft during axial movement thereof and precluding axial movement of the shaft during rocking movement, and insertible means to positively preclude all rocking movement of the shaft.

ELMER W. CHRISTY.
WILLIAM S. DICKSON.